(12) United States Patent
Matsuura

(10) Patent No.: US 7,171,533 B2
(45) Date of Patent: Jan. 30, 2007

(54) STORAGE DEVICE

(75) Inventor: Masanori Matsuura, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 354 days.

(21) Appl. No.: 10/721,097

(22) Filed: Nov. 26, 2003

(65) Prior Publication Data
US 2004/0107351 A1    Jun. 3, 2004

(30) Foreign Application Priority Data
Nov. 29, 2002 (JP) ............................ 2002-348774

(51) Int. Cl.
*G06F 12/14* (2006.01)
(52) U.S. Cl. ...................... 711/167; 713/182
(58) Field of Classification Search ................ 711/167; 713/182
See application file for complete search history.

(56) References Cited

U.S. PATENT DOCUMENTS

| 5,857,024 | A |   | 1/1999 | Nishino et al. |
| 6,002,627 | A | * | 12/1999 | Chevallier ................... 365/212 |
| 6,157,992 | A | * | 12/2000 | Sawada et al. ............. 711/167 |
| 6,400,625 | B2 | * | 6/2002 | Arimoto et al. ............ 365/201 |
| 6,434,096 | B1 | * | 8/2002 | Akagi et al. ............. 369/44.32 |
| 6,437,308 | B1 | * | 8/2002 | Koh ........................ 250/214 R |
| 6,552,936 | B2 | * | 4/2003 | Shiga et al. ............ 365/189.02 |
| 2002/0060659 | A1 | * | 5/2002 | Matsuda et al. ............... 345/94 |
| 2002/0141280 | A1 | * | 10/2002 | Hamamoto et al. ......... 365/233 |
| 2003/0041224 | A1 | * | 2/2003 | Toda ........................... 711/167 |
| 2003/0233562 | A1 | * | 12/2003 | Chheda et al. .............. 713/193 |

FOREIGN PATENT DOCUMENTS

JP            6-139422           5/1994

* cited by examiner

*Primary Examiner*—Stephen C. Elmore
*Assistant Examiner*—Daniel Kim
(74) *Attorney, Agent, or Firm*—McDermott Will & Emery LLP

(57) ABSTRACT

A data mask section outputs memory data read from a memory array unit for a predetermined time period that is shifted from an edge timing of a clock signal, while a microcomputer takes in the data output from the data mask section at the edge timing of the clock signal. Thus, the microcomputer is capable of appropriately taking in the memory data only when the frequency of the clock signal is within a predetermined range, and accordingly, it is difficult to fraudulently obtain the memory data. Furthermore, the data mask section may output random data, or the like, during a time period other than the predetermined time period. In such a case, it is difficult to analyze the memory data, and the confidentiality of the memory data is improved.

6 Claims, 13 Drawing Sheets

STORAGE DEVICE

BACKGROUND OF THE INVENTION

The present invention relates to a storage device having a semiconductor memory and a processor, such as an IC card, or the like, and specifically to a technique for improving the confidentiality of data stored in the semiconductor memory.

In recent years, the market of a storage device incorporating a microcomputer and a semiconductor storage, such as an IC card, or the like, has been rapidly increasing, and such a device has been applied to various uses.

Especially, a use of a storage device wherein an IC card, or the like, includes personal data or financial data has been more popular. In the case of such a use, the confidentiality of data stored in the storage device is a matter of concern.

On the other hand, in the course of production of an IC card, or in the case where a defect is found in an IC card already shipped to a market, a company that manufactures IC cards or performs IC card services is frequently required to read data from the IC card to analyze internal data.

Thus, it is required to prevent a fraudulent third person from reading data and, on the other hand, it is required to allow a developer of an IC card, for example, to read internal data in the course of development of the IC card.

There has been proposed a technique of achieving both protection of confidentiality and convenience of analysis wherein each IC card has its inherent number, and the inherent number is collated with a number input through a host apparatus to open/close a gate circuit (see, for example, Japanese Unexamined Patent Publication No. 6-139422).

Furthermore, there has been a known technique of encrypting data to be stored such that the data cannot be readily decrypted even if it is read out.

However, in the method of collating an inherent number, the IC card is vulnerable to a fraudulent access if the inherent number is revealed. Moreover, there is a possibility that confidentiality is breached by sequentially inputting a series of numbers. Further, there is a possibility that the IC card is dismantled and internal data is analyzed by touching a wire with a probe. In such a case, it is difficult to protect the confidentiality.

In the case where data is encrypted, high confidentiality protection is not necessarily obtained because the level of confidentiality is determined by the encryption strength.

SUMMARY OF THE INVENTION

The present invention was conceived in view of the above problems. An objective of the present invention is to provide a technique for more readily increasing the confidentiality of a storage device, such as an IC card, and more readily reading internal data as necessary.

For the purpose of solving the above problems, the first storage device of the present invention comprises: a memory; a microcomputer for taking in data read from the memory according to a externally-supplied clock signal or a clock signal generated based on the externally-supplied clock signal; a timing signal output circuit for outputting a timing signal indicative of a timing that is shifted by a predetermined time period from a predetermined edge in a read control signal which is used for controlling reading of data from the memory; and a read data control circuit for performing control such that the microcomputer takes in the data read from the memory based on the timing signal only when the clock signal has a predetermined frequency.

With the above structure, memory data stored in a memory is taken in the microcomputer and output to the outside of the storage device, and the microcomputer normally operates, only when a clock signal has a predetermined frequency. Thus, a fraudulent action of analyzing the memory data with a usually-employed low-frequency clock signal is prevented, whereby the confidentiality of data stored in the storage device is improved.

The second storage device of the present invention is based on the first storage device, wherein the read data control circuit controls based on the timing signal at least any one of the followings: whether or not the data read from the memory is output to the microcomputer; the timing for outputting the data read from the memory to the microcomputer; and the timing for taking the data read from the memory into the microcomputer.

The third storage device of the present invention is based on the second storage device, wherein the read data control circuit controls whether or not the data read from the memory is output to the microcomputer based on the relationship between the timing which is indicated by the timing signal and the timing at which an edge subsequent to the predetermined edge occurs in the read control signal.

The fourth storage device of the present invention is based on the second storage device, wherein the read data control circuit outputs the data read from the memory to the microcomputer for a predetermined time period that is determined according to the timing signal.

The fifth storage device of the present invention is based on the second storage device and further comprises a mask circuit for outputting the data read from the memory to the microcomputer for a predetermined time period, wherein the read data control circuit performs control such that the microcomputer takes in data output from the mask circuit at a predetermined timing that is determined according to the timing signal.

With the above structures, memory data stored in a memory is readily prevented from being taken in a microcomputer as described above.

The sixth storage device of the present invention is based on the third storage device, wherein when the read data control circuit does not output the data read from the memory to the microcomputer, the read data control circuit outputs data different from the data read from the memory.

The seventh storage device of the present invention is based on the fourth storage device, wherein the read data control circuit outputs data different from the data read from the memory during a time period other than the predetermined time period.

The eighth storage device of the present invention is based on the fifth storage device, wherein the mask circuit outputs data different from the data read from the memory during a time period other than the predetermined time period.

With the above structures, memory data is not taken in a microcomputer when a clock signal does not have a predetermined frequency. Further, even when a storage device is dismantled and analyzed by touching a transmission path of the memory data with a probe, fraudulent obtainment of information is readily prevented because it is difficult to precisely distinguish the memory data.

The ninth storage device of the present invention is based on the first storage device and further comprises a temperature detection circuit, wherein the read data control circuit performs control such that the microcomputer takes in the data read from the memory only when the temperature detection circuit detects a predetermined temperature.

The tenth storage device of the present invention is based on the first storage device and further comprises a light detection circuit, wherein the read data control circuit performs control such that the microcomputer takes in the data read from the memory only when the light detection circuit detects light having a predetermined intensity.

With the above structures, when the detected temperature or the intensity of detected light is not appropriate, memory data is prevented from being taken in a microcomputer. Thus, fraudulent obtainment of information is more readily prevented.

The eleventh storage device of the present invention comprises: a memory; a microcomputer for taking in data read from the memory according to a externally-supplied clock signal or a clock signal generated based on the externally-supplied clock signal; a mask circuit for outputting the data read from the memory to the microcomputer for a predetermined time period; and a timing control circuit for performing control such that the predetermined time period during which the mask circuit outputs the data read from the memory and the timing for taking the data output from the mask circuit into the microcomputer are variable.

The twelfth storage device of the present invention is based on the eleventh storage device, wherein the timing control circuit sets the predetermined time period during which the mask circuit outputs the data read from the memory and the timing for taking the data output from the mask circuit into the microcomputer, based on at least any one of the followings: data retained in a predetermined area of the memory; an address output from the microcomputer; and a predetermined signal output from the microcomputer.

With the above structures, the timing for inputting memory data into a microcomputer is different in every memory access operation, it is difficult to dismantle and analyze a storage device by touching a transmission path of the memory data with a probe. Thus, the confidentiality of data stored in the storage device is readily improved.

DESCRIPTION OF THE PREFERRED EMBODIMENTS

Hereinafter, IC cards which are the storage devices according to embodiments of the present invention are described with reference to the drawings.

(Embodiment 1)

Figure 1:
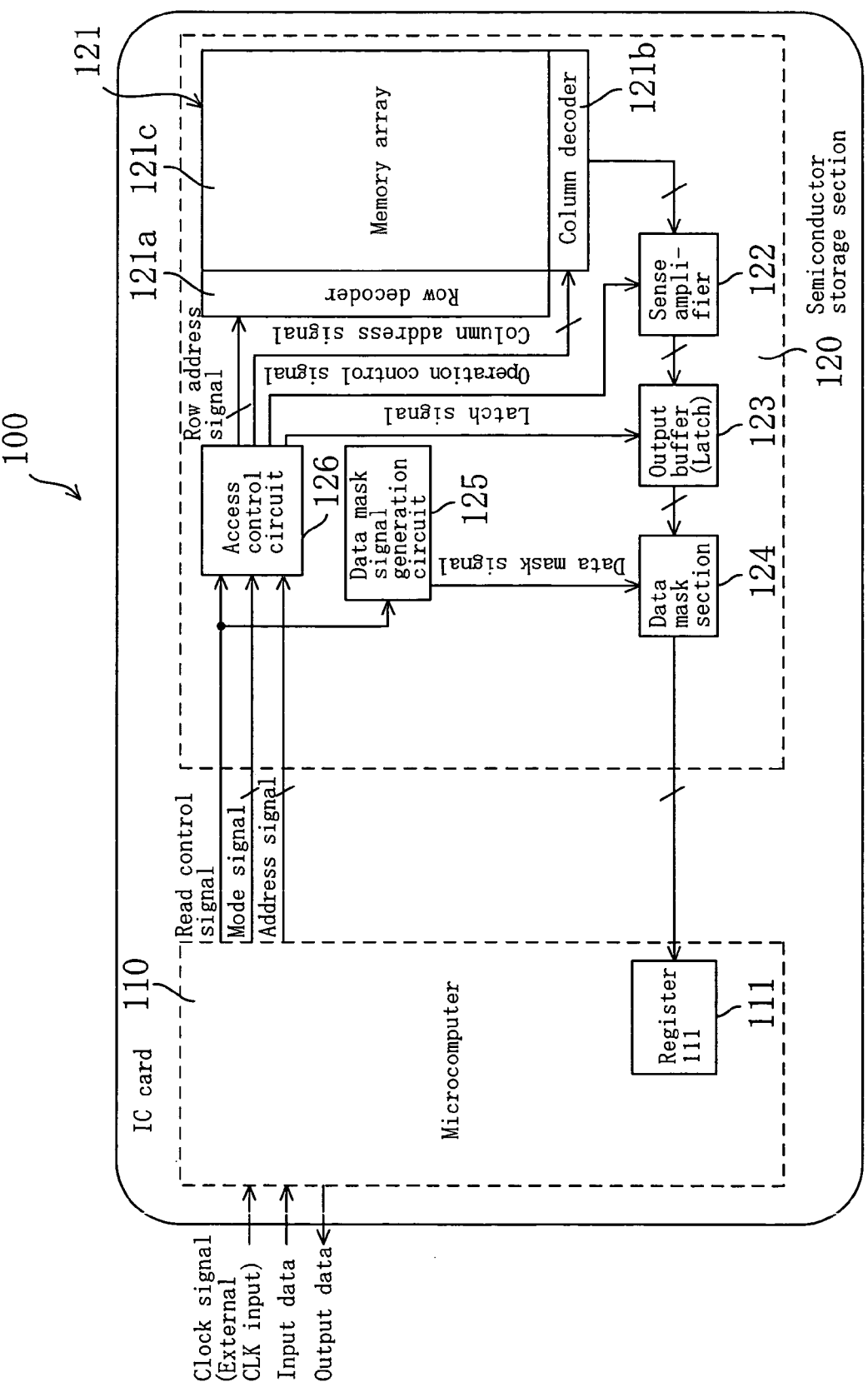
FIG. 1 is a block diagram showing the entire structure of an IC card 100 according to embodiment 1.

FIG. 1 is a block diagram showing the entire structure of an IC card 100 according to embodiment 1.

In the IC card 100 shown in FIG. 1, a microcomputer (processor) 110 includes a register 111 which stores data read from a semiconductor storage section 120 (described later). The microcomputer (processor) 110 performs control of data input/output operations and various data processing in the IC card 100 according to an external clock signal or a clock signal obtained by dividing or multiplying the frequency of the external clock signal. More specifically, the microcomputer 110 writes data supplied from an external device in the semiconductor storage section 120 and outputs data read from the semiconductor storage section 120 or data which has undergone a predetermined process to an external device by executing, for example, a program stored in the semiconductor storage section 120.

The semiconductor storage section 120 stores programs to be executed by the microcomputer 110 and various data. The semiconductor storage section 120 includes a memory array unit (memory) 121, a sense amplifier 122, an output buffer 123, a data mask section (read data control circuit) 124, a data mask signal generation circuit (timing signal output circuit) 125, and an access control circuit 126.

The memory array unit 121 substantially stores programs and data. Specifically, the memory array unit 121 writes data in or reads data from an area of a memory array 121c which is designated by a row decoder 121a and a column decoder 121b based on a row address and a column address output from the access control circuit 126.

The sense amplifier 122 amplifies the voltage output from the memory array 121c and outputs a data signal which is set at a H (High) level or a L (Low) level according to the data (0 or 1) stored in an area designated by the row decoder 121a and the column decoder 121b.

The output buffer 123 latches the data signal output from the sense amplifier 122 and outputs a stable signal.

Figure 2:
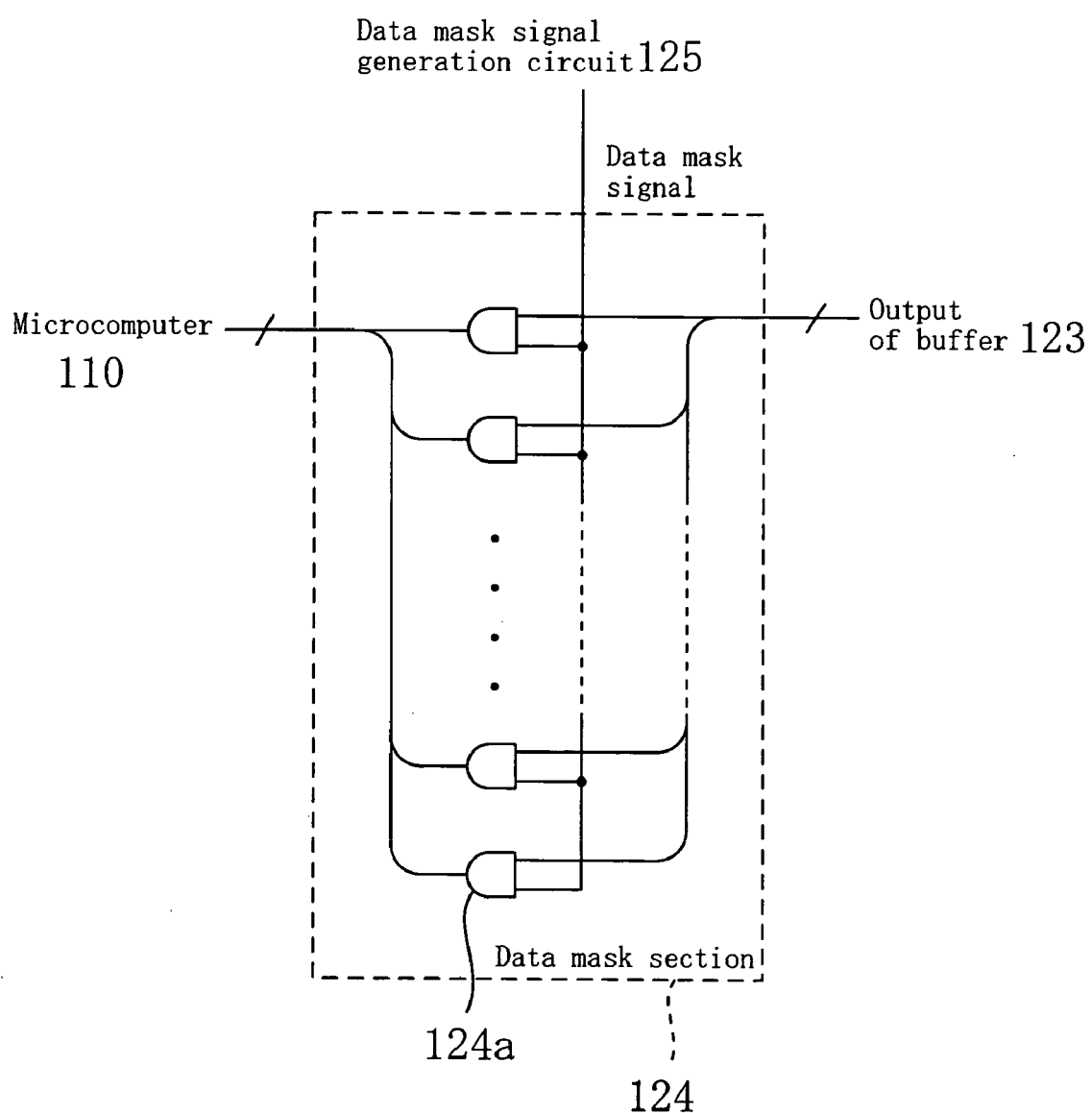
FIG. 2 is a circuit diagram showing a specific structure of a data mask section 124 according to embodiment 1.

The data mask section 124 controls whether or not the data signal input from the output buffer 123 is output according to a data mask signal output from the data mask signal generation circuit 125. Specifically, referring to FIG. 2, the data mask section 124 includes AND circuits 124a. The number of AND circuits 124a corresponds to the number of bits of data. Alternatively, the data mask section 124 may include a selector (switch) for selectively switching between the signal output from the output buffer 123 and a L-level signal according to the data mask signal in place of the AND circuits 124a.

Figure 3:
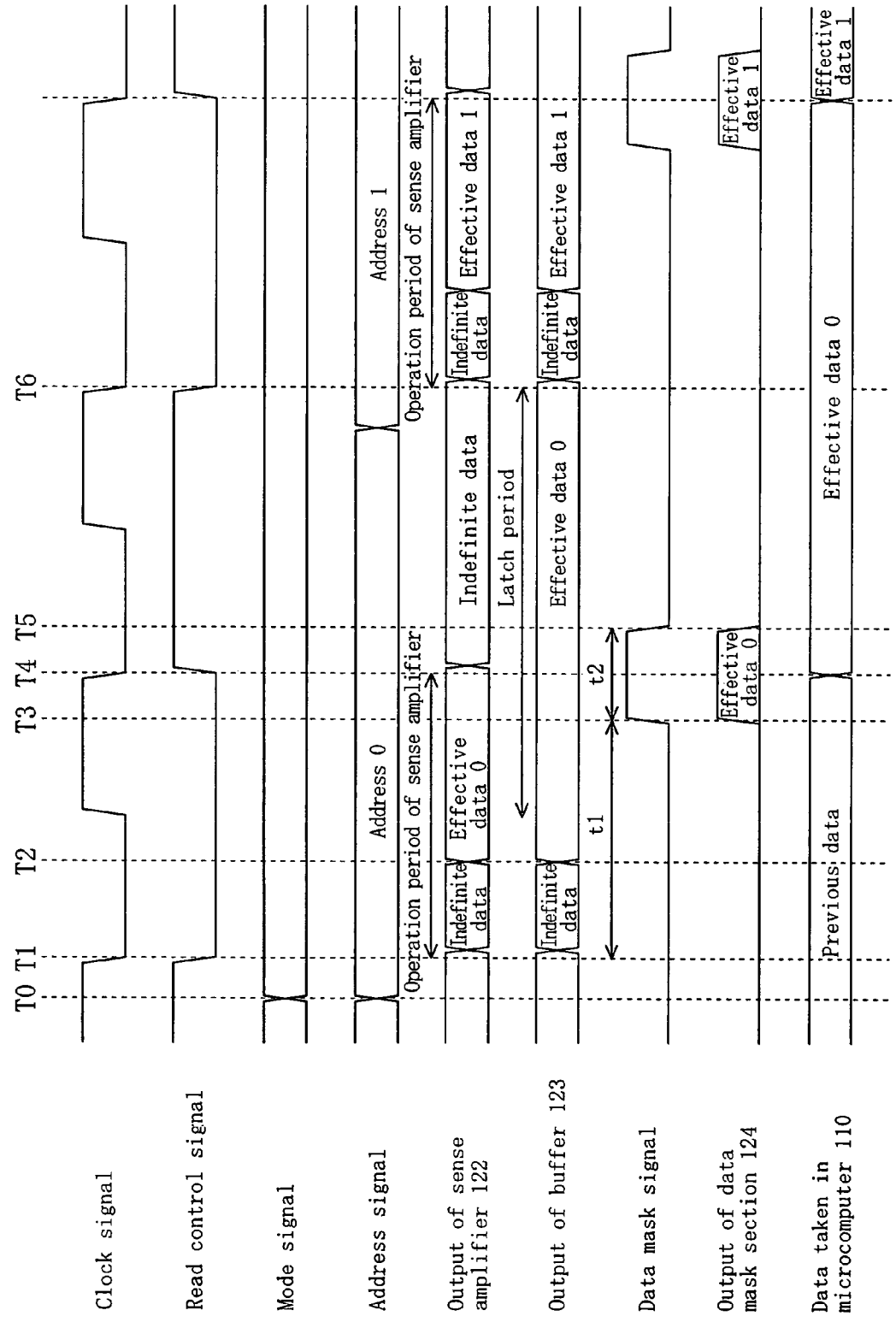
FIG. 3 is a timing chart illustrating an operation with an appropriate clock frequency according to embodiment 1.

For example, as shown in FIG. 3, the data mask signal generation circuit 125 outputs the data mask signal that is at the H level during the time interval between time T3, which is delayed by time period t1 from a falling edge of a read control signal obtained by dividing (or multiplying) a clock signal, and time T5, i.e., during time period t2. Herein, the time period t1 and time period t2 are determined in advance such that the following relationship is satisfied:

$$t1 < tck < t1 + t2$$

wherein tck is a cycle of an appropriate clock signal.

The access control circuit 126 controls an access by the microcomputer 110 to the memory array unit 121. More specifically, for example, the access control circuit 126 outputs a row address signal and column address signal, an operation control signal for controlling the operation of the sense amplifier 122, a latch signal, and a mode control signal (not shown) for setting various read modes, or the like, based on the read control signal, a mode signal and an address signal, which are output from the microcomputer 110.

In general, the IC card 100 further includes a circuit for writing data in the memory array unit 121, etc., but description of such components is herein omitted for convenience of illustration.

The operation of reading data from the memory array unit 121 of the IC card 100 having the above-described structure is briefly described. For example, a single read operation corresponds to two cycles of the clock signal. The read control signal output from the access control circuit 126 is at the L level in the first cycle, only during which the sense amplifier 122 is active. Data signal output from the activated sense amplifier 122 is latched by the output buffer 123 until the end of the second cycle. The output of the output buffer 123 is masked by the data mask section 124 such that the data signal is valid during the interval between time T3 and time T5. The microcomputer 110 takes in the data output from the data mask section 124 at a timing when the clock signal falls at the end of the first cycle.

Hereinafter, the operation is described in more detail by illustrating an example where data stored in the memory array unit 121 is read out and output from the microcomputer 110 to the outside of the IC card 100 while the clock signal has a predetermined frequency.

In the first place, a clock signal is input to the IC card 100 from an external device, while control data, which indicates the operation mode of outputting data stored in the memory array unit 121 as it is, and address data, which designate an address from which data is to be read, are also input to the IC card 100 as input data.

The microcomputer 110 outputs a mode signal that indicates the read mode and an address signal to the access control circuit 126 at time T0 as shown in FIG. 3. According to the mode signal and the address signal, the access control circuit 126 outputs a row address signal and a column address signal to the row decoder 121a and the column decoder 121b, respectively, thereby designating an area of the memory array 121c from which data is to be read.

Then, the microcomputer 110 pulls down the read control signal to the L level at time T1, i.e., at a timing when the clock signal falls. The access control circuit 126 outputs an operation control signal (power supply voltage or ground voltage) to the sense amplifier 122, whereby the sense amplifier 122 is activated. After being in an indefinite state for a certain time period, the sense amplifier 122 outputs, at time T2, a signal having a level determined according to the content stored in the memory array unit 121. The output buffer 123 outputs a signal output from the sense amplifier 122 as it is at the same level.

The access control circuit 126 pulls up a latch signal, which is output to the output buffer 123, to the H level at a predetermined timing that occurs after time T2, after which the output of the sense amplifier 122 is stable. The output buffer 123 maintains the level of a signal that is output from the sense amplifier 122 at this timing. That is, the output of the operation control signal from the access control circuit 126 is stopped at time T4, i.e., a timing at which the read control signal rises to the H level, whereby the output of the sense amplifier 122 is turned into an indefinite state. However, the output buffer 123 continues to output a data signal having a level determined according to the content stored in the memory array unit 121 until time T6, i.e., the next falling edge of the read control signal.

At a timing when time interval t1 has been passed after the falling edge of the read control signal (time T1), i.e., at time T3, the data mask signal is pulled up to the H level, and the H level of this signal is maintained only for time interval t2 (from T3 to T5). Accordingly, the data mask section 124 outputs the data signal stored in the output buffer 123 only for a time period from T3 to T5.

On the other hand, at time T4 where the clock signal falls, the microcomputer 110 takes in the data signal output from the data mask section 124, i.e., the data read from the memory array unit 121 (memory data), and internally performs a process on the data, outputting the processed data from the IC card 100 to an external device. That is, if the frequency of the clock signal is such that a cycle of the clock signal (T1 to T4) is in the range of t1 to t1+t2, the memory data is appropriately taken in the microcomputer 110 and output from the IC card 100 to an external device.

Figure 4:
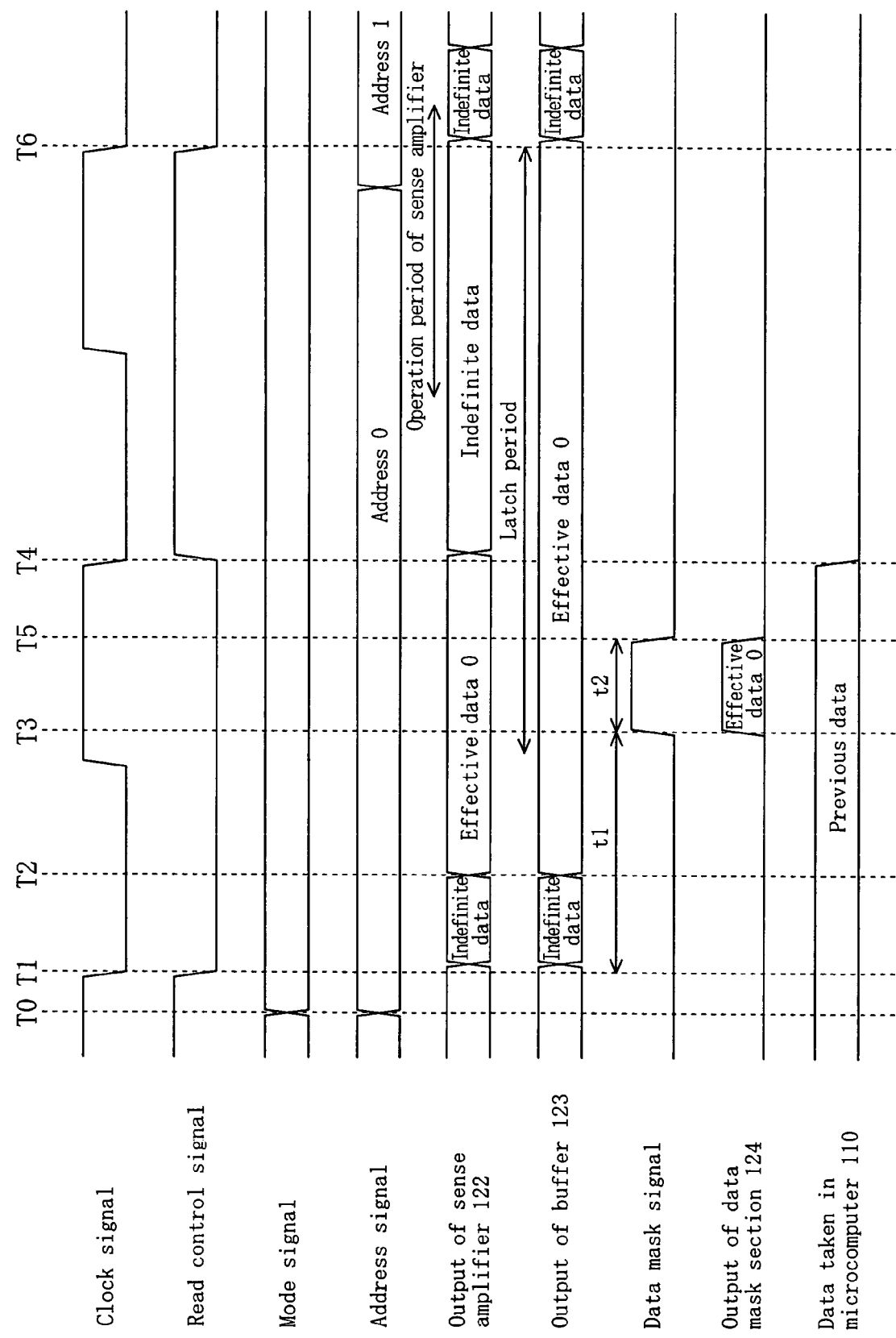
FIG. 4 is a timing chart illustrating an operation with an inappropriate clock frequency according to embodiment 1.

If the frequency of the clock signal fails to satisfy the above condition, for example, if the cycle of the clock signal is longer than t1+t2 as shown in FIG. 4, the microcomputer 110 takes in the L level signal at time T4, i.e., at the falling edge of the clock signal, because the data mask section 124 outputs the L level signal irrespective of the memory data. Thus, the memory data is not output from the IC card 100 to an external device. (It should be noted that, in an actual case, an instruction code to be executed by the microcomputer 110 is also not appropriately read from the memory array unit 121, and accordingly, the operation of the microcomputer 110 itself is not appropriately carried out.)

In general, a digital circuit which operates in synchronization with a clock signal appropriately operates even when the frequency of the clock signal is decreased. Thus, in many cases, a fraudulent third person, who attempts to analyze an IC card and read a stored content therefrom, supplies a clock signal of a low frequency for the purpose of decreasing the circuit operation speed in order to make the analysis easy in many cases. However, the above-described arrangement of the present invention, wherein memory data is read out to the microcomputer 110 only with a predetermined frequency of the clock signal, readily prevents fraudulent obtainment of data, or the like.

It should be noted that the data mask signal may rise to the H level more than once. In such a case, an appropriate operation can be achieved with a plurality of different clock signal frequencies. Thus, in the case of an IC card where the clock signal frequency is switched between a high speed operation mode and a low power consumption mode, the IC card appropriately operates in either mode but does not appropriately operate at the other frequency.

The present invention is not limited to the above-described structure where memory data is output from the data mask section 124 at a timing shifted from an edge of the clock signal. In an alternative example, any one of the timings for starting and stopping the output of the memory data from the data mask section 124 (mask circuit) occurs in synchronization with an edge of the clock signal, while the timing for taking the memory data into the microcomputer 110 occurs at a timing that is shifted from an edge of the clock signal by a predetermined time period. In a still alternative example, all the timings of starting, stopping, and taking in the output of the memory data occur at a timing that is shifted from an edge of the clock signal. Also in these alternative examples, the effects of the present invention are achieved.

Alternatively, an arrangement is made within the scope of the present invention wherein, if an edge of the clock signal (read control signal) occurs during the cycle where the data mask signal is at the H level, memory data is output from the data mask section whereas, if not, the memory data is not output. That is, whether or not the memory data is output may be controlled according to the relationship between the data mask signal and the clock signal. Even in such a case, the microcomputer 110 takes in the memory data only when the frequency of the clock signal is at a predetermined frequency.

The method of embodiment 1 may not be solely used but may be used in combination with various known methods, such as the method of performing collation with a secret number, the method of encrypting the memory data itself, or the like, whereby the confidentiality is more improved.

(Embodiment 2)

Hereinafter, an IC card of embodiment 2 is described. It should be noted that, in the embodiments described below, components having the same functions as those of embodiment 1 are denoted by the same reference numerals, and descriptions thereof are omitted.

Figure 5:
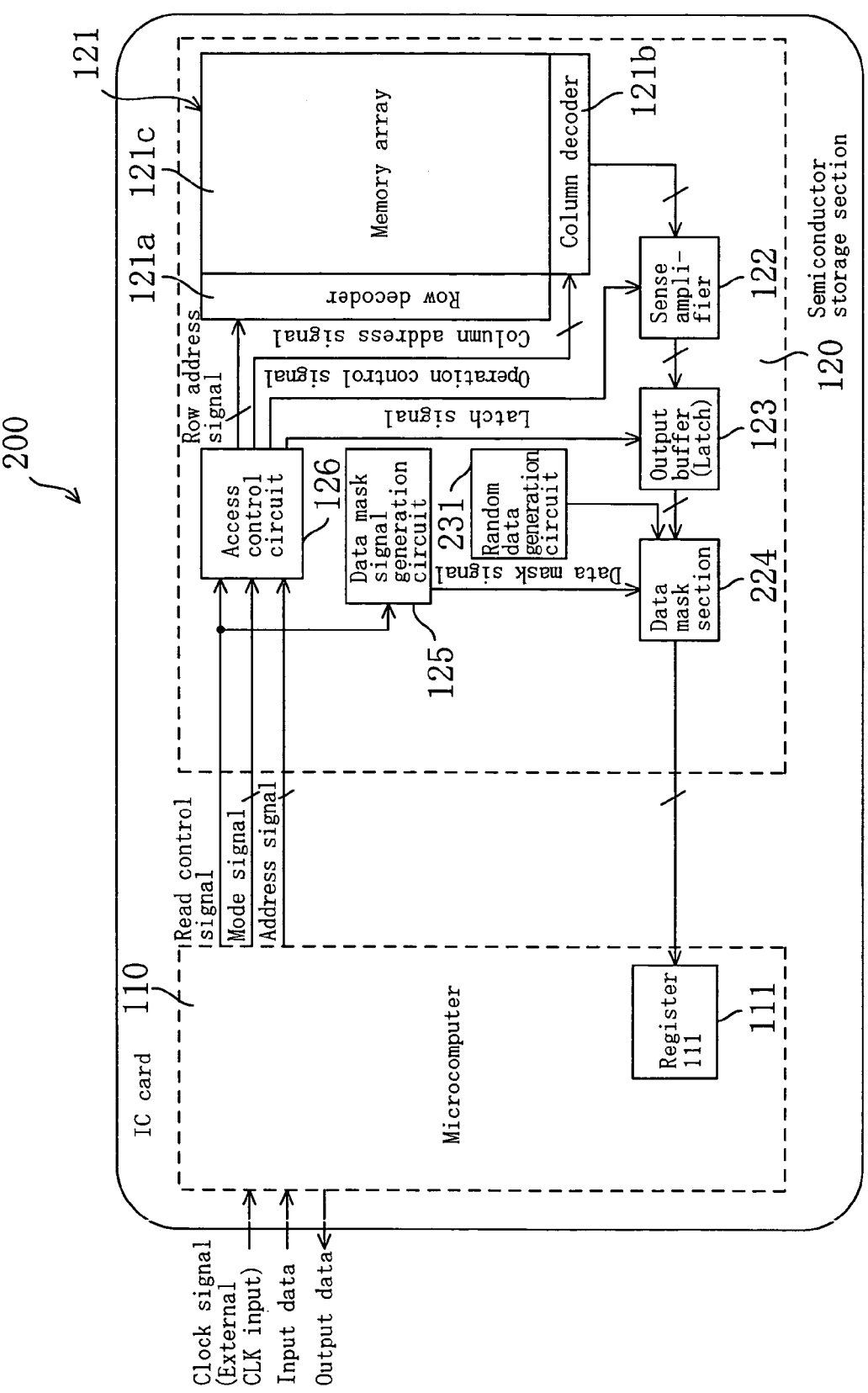
FIG. 5 is a block diagram showing the entire structure of an IC card 200 according to embodiment 2.

The IC card 200 of embodiment 2 shown in FIG. 5 is different from the IC card 100 of embodiment 1 in that the IC card 200 includes a data mask section 224 in place of the data mask section 124 and further includes a random data generation circuit 231.

The random data generation circuit 231 outputs a random data signal at a predetermined timing.

Figure 6:
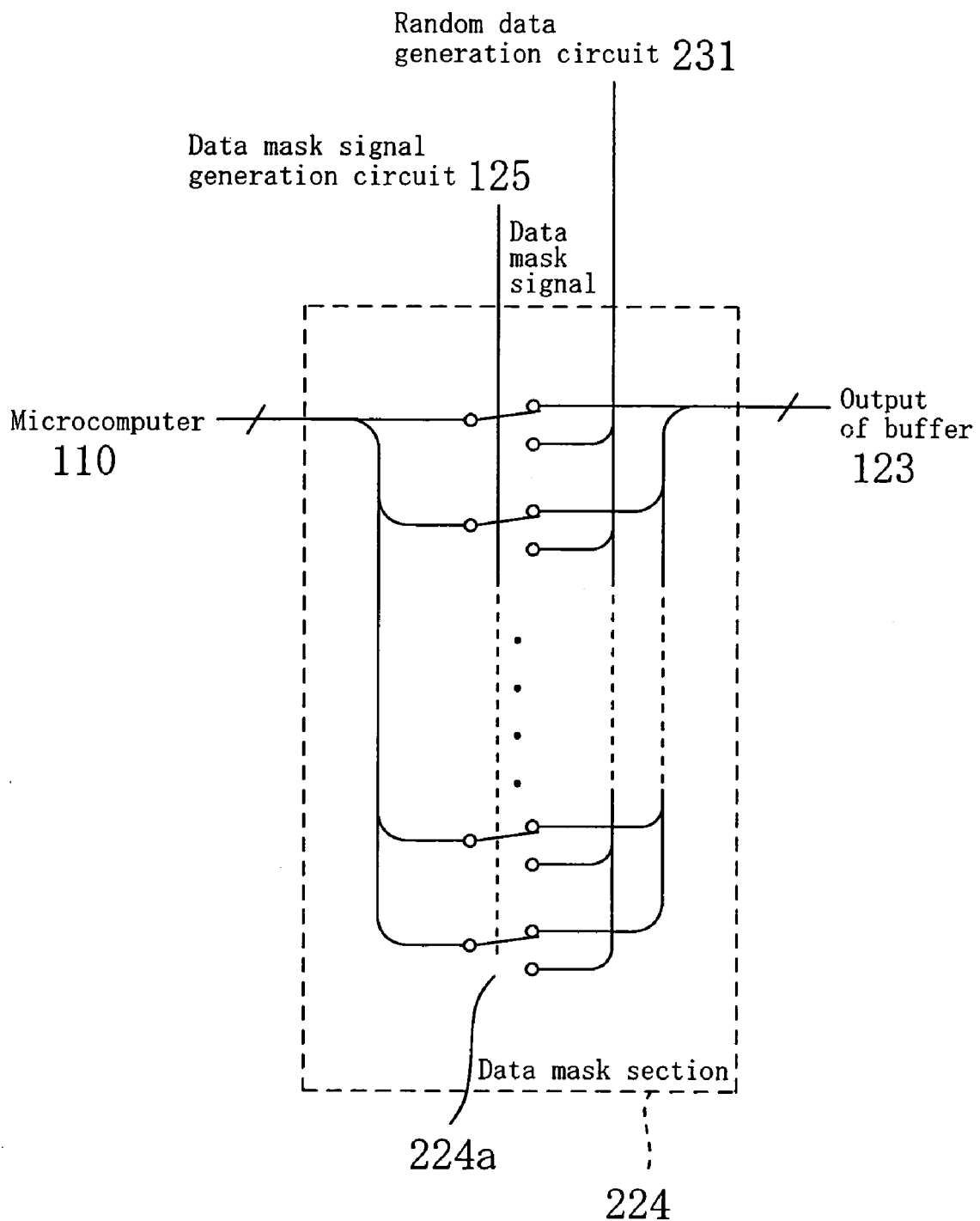
FIG. 6 is a circuit diagram showing a specific structure of a data mask section 224 according to embodiment 2.

Specifically, referring to FIG. 6, the data mask section 224 includes selectors 224a. The number of selectors 224a corresponds to the number of bits of data.

Figure 7:
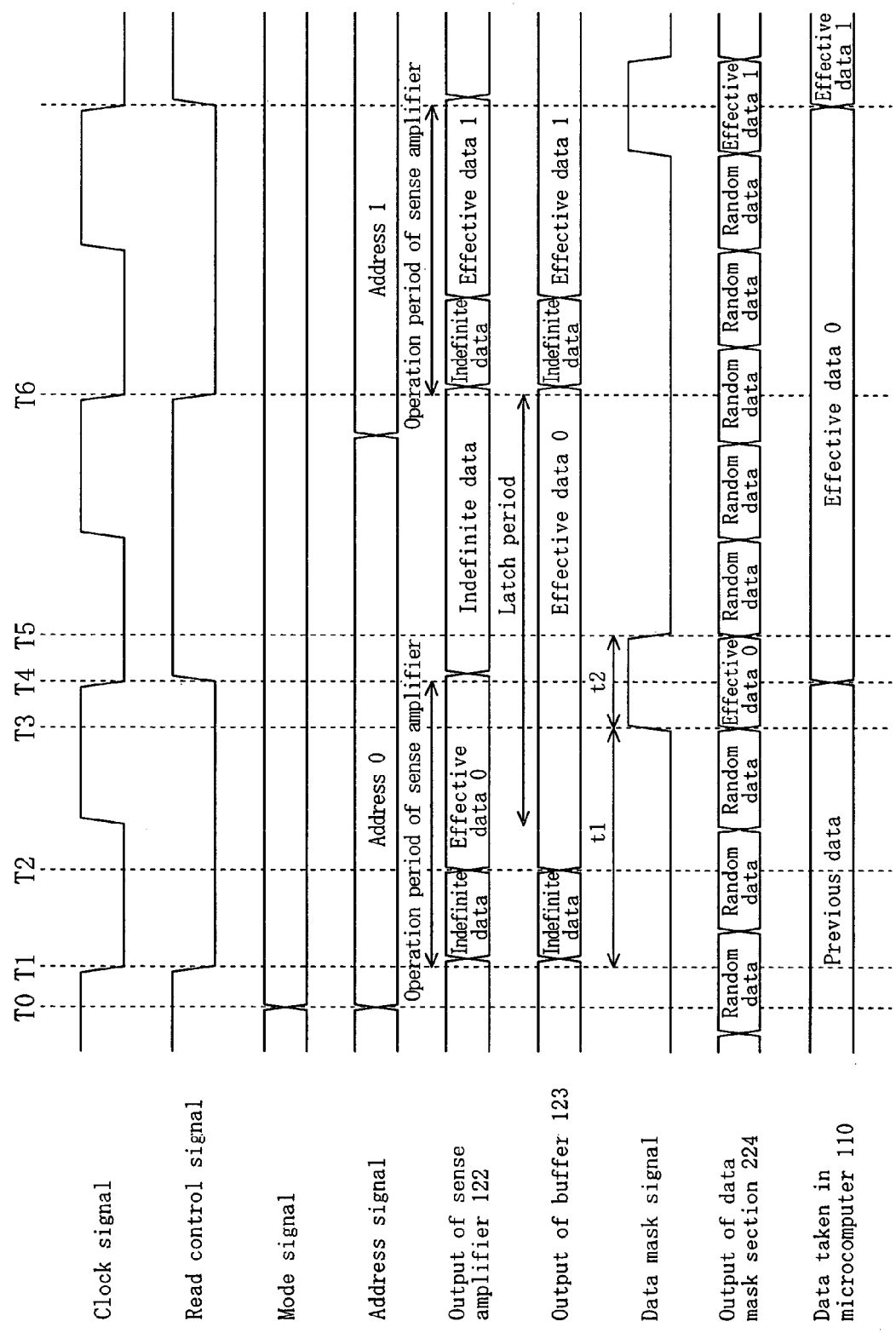
FIG. 7 is a timing chart illustrating an operation with an appropriate clock frequency according to embodiment 2.

With the above structure, as illustrated in FIG. 7, when the data mask signal is at the H level, the data mask section 224 outputs the data signal read from the memory array unit 121 as in embodiment 1, whereas the data mask section 224 outputs the random data signal output from the random data generation circuit 231 when the data mask signal is at the L level.

Figure 8:
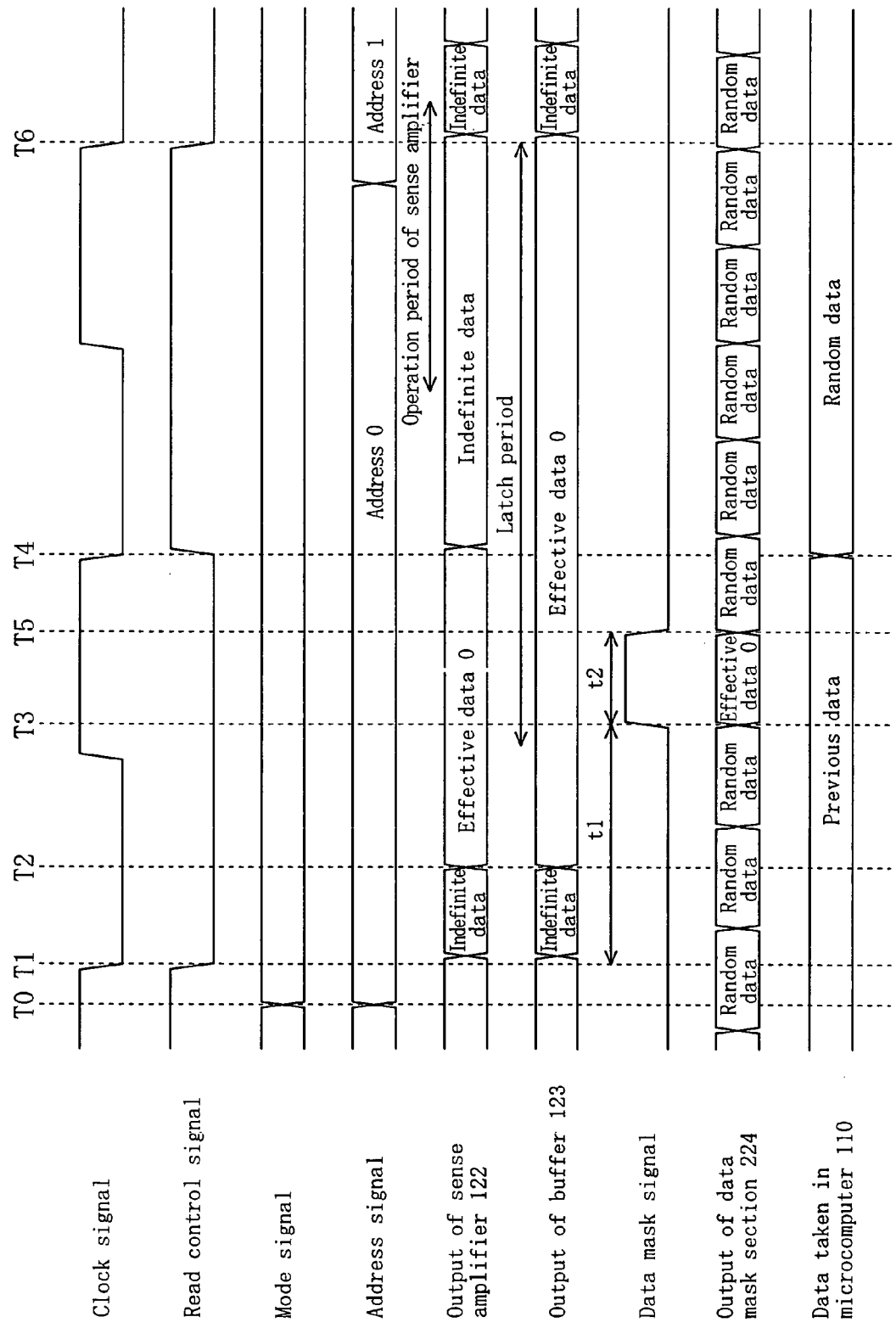
FIG. 8 is a timing chart illustrating an operation with an inappropriate clock frequency according to embodiment 2.

That is, if the frequency of the clock signal is appropriate, the microcomputer 110 takes in the data signal at a timing when the signal read from the memory array unit 121 is output from the data mask section 224 and operates in an appropriate fashion, irrespective of the random data signal output from the random data generation circuit 231. On the other hand, when the frequency of the clock signal is low, the microcomputer 110 takes in the random data signal output from the data mask section 224 as illustrated in FIG. 8 and therefore does not operate in an appropriate fashion.

Even in the case where a third person dismantles an IC card and analyzes a signal inside the IC card by touching an LSI chip or a wire pattern with a probe, it is actually difficult to fraudulently obtain a content stored in the memory array unit 121 because it is difficult to distinguish memory data from random data. Moreover, even if a clock signal having an appropriate frequency is supplied so that the microcomputer 110 normally operates, data which is prepared for use only inside the IC card and is not supposed to be output to an external device (data used by a program in such a way) is difficult to distinguish from the random data and is therefore difficult to fraudulently read out.

Herein, the random data does not need to have high randomness in a strict meaning. According to the present invention, the random data only needs to be dummy data that is different from but confusing with the memory data. For example, data obtained by shuffling the bit positions of the memory data or address, or data obtained by subjecting the bit-shuffled data to a predetermined conversion, may be used as the random data.

The cycle of changing the random data is not limited to any particular cycle but preferably corresponds to the H-level period of the data mask signal because, in such a case, it is more difficult to distinguish the memory data from the random data.

(Embodiment 3)

Figure 9:
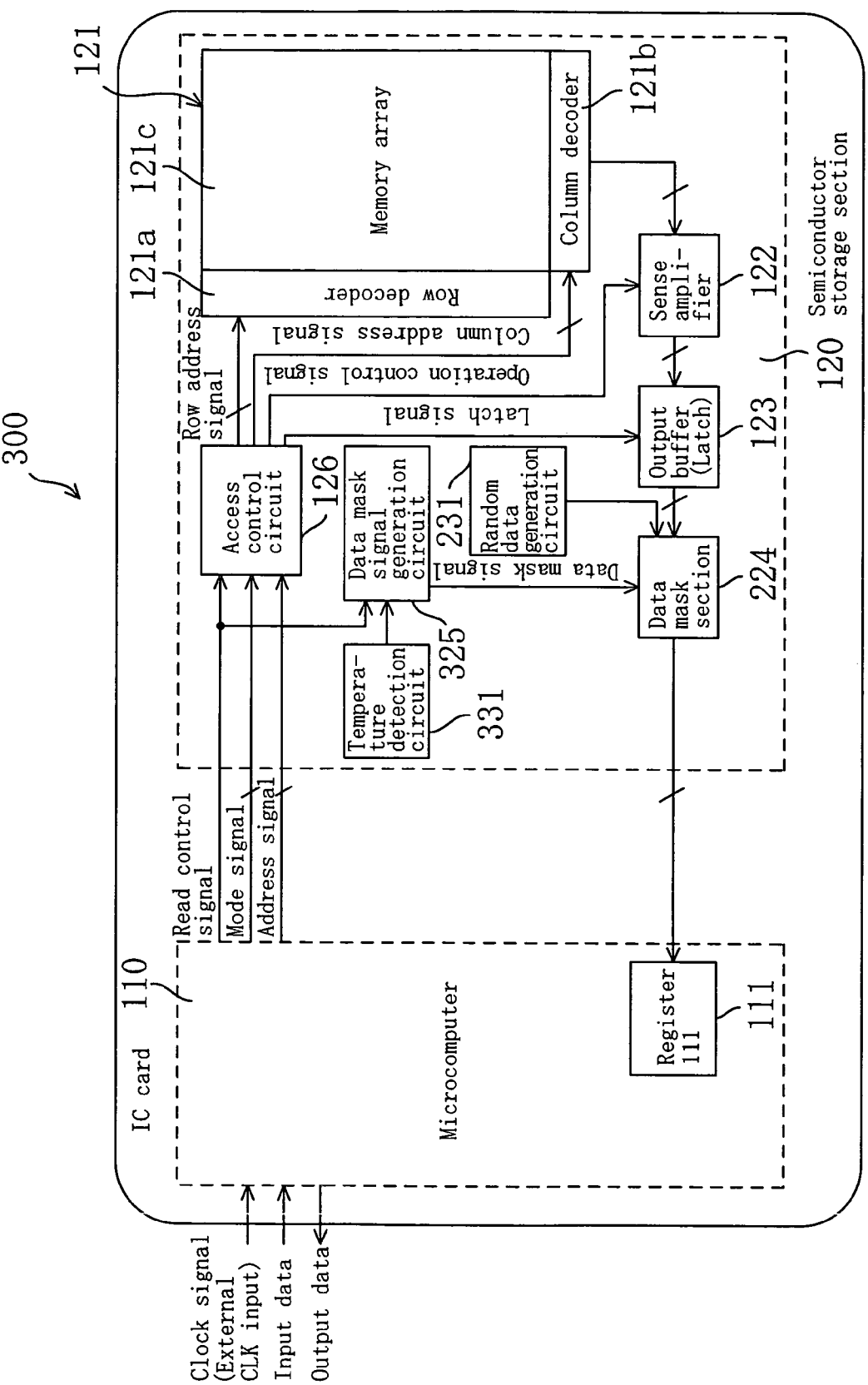
FIG. 9 is a block diagram showing the entire structure of an IC card 300 according to embodiment 3.

Referring to FIG. 9, an IC card 300 of embodiment 3 is different from the IC card 200 of embodiment 2 in that the IC card 300 further includes a temperature detecting circuit 331 and includes a data mask signal generation circuit 325 in place of the data mask signal generation circuit 125. The data mask signal generation circuit 325 of embodiment 3 pulls up the data mask signal to the H level at the same timing as that of embodiment 2 only when a temperature detected by the temperature detecting circuit 331 is within a predetermine range.

With the temperature detecting circuit 331 and the data mask signal generation circuit 325, the microcomputer 110 normally operates only when the detected temperature is in the predetermined range and a clock signal having a predetermined frequency is supplied, but when otherwise, memory data is not read out. Thus, the confidentiality of the memory data is readily more improved.

Even in the case where a third person dismantles and analyzes an IC card as described above, the analysis with a probe is prevented more readily because no memory data is transmitted through a signal line (data bus) between the data mask section 224 and the microcomputer 110 when the detected temperature is not within a predetermined range.

In the structure described herein, the memory data is transmitted from the memory array unit 121 to the data mask section 224. However, in general, a signal transmitted between the memory array unit 121 and the output buffer 123 is feeble or has a high output impedance, and therefore, it is difficult to detect the signal by touching the circuit with a probe. Furthermore, since the circuits between the memory array unit 121 and the data mask section 224 are formed in the close vicinity of each other, it is difficult to identify a route of a data signal by analyzing the circuits, and it is not easy to physically touch the route with a probe. Thus, in an actual case, the confidentiality is significantly improved only by transmitting the random data signal (i.e., by preventing the memory data from being transmitted) through the route between the data mask section 224 and the microcomputer 110, i.e., the signal route which is readily identified as a data bus by observing a wiring pattern, or the like, and is relatively long so that it is readily touched with a probe.

The condition for outputting the H-level data mask signal from the data mask signal generation circuit 325 is not only detection of a temperature within a predetermined range but also detection of a temperature variation, for example, from a high temperature to a low temperature and from the low temperature to the high temperature.

The arrangement of preventing the memory data from being output from the data mask section 224 may be substituted with the arrangement of preventing the microcomputer 110 from taking in the memory data output from the data mask section 224.

(Embodiment 4)

Figure 10:
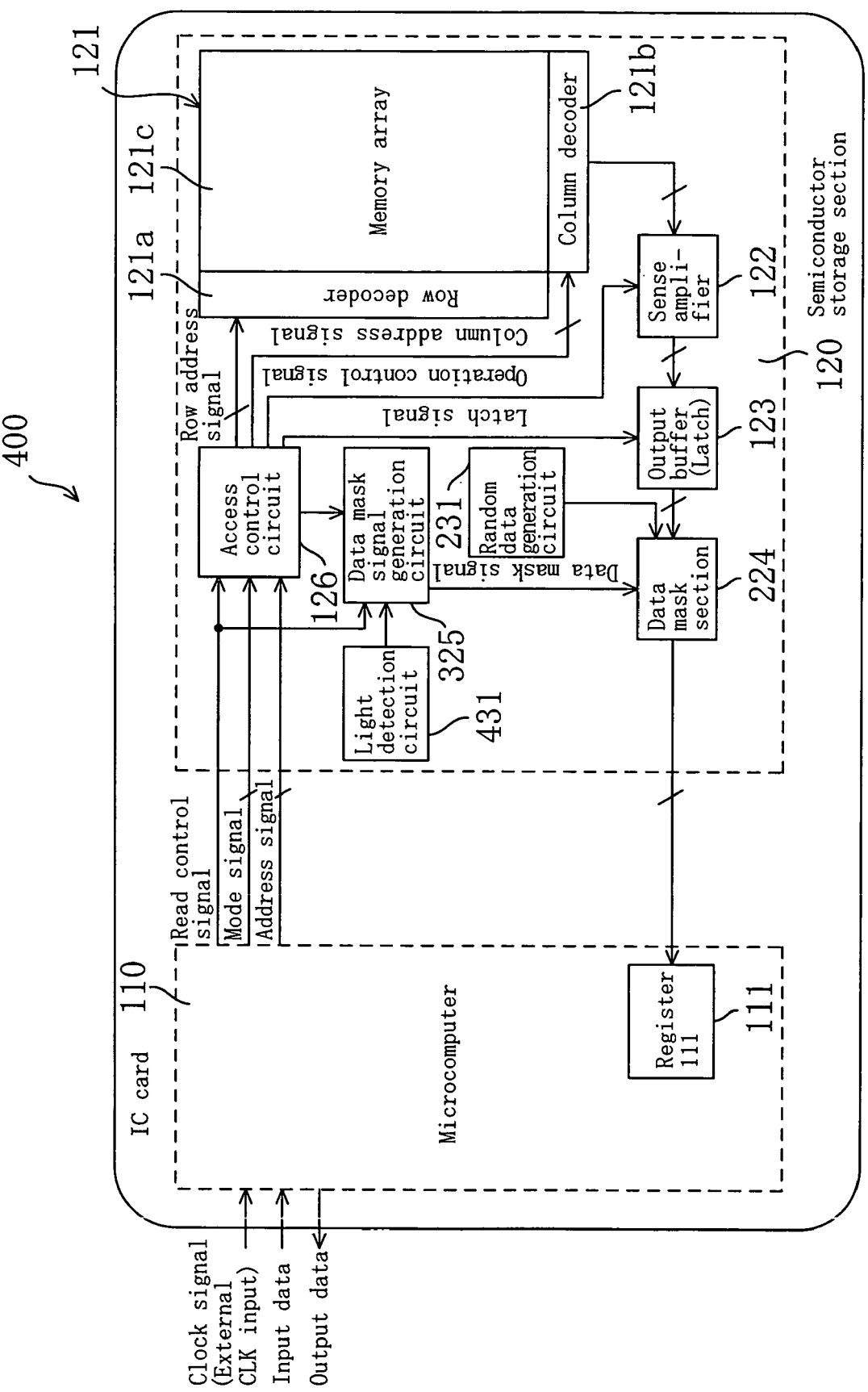
FIG. 10 is a block diagram showing the entire structure of an IC card 400 according to embodiment 4.

Referring to FIG. 10, an IC card 400 of embodiment 4 includes a light detection circuit 431 in place of the temperature detection circuit 331 of embodiment 3. According to embodiment 4, the data mask signal is pulled to the H level according to the intensity of light detected by the light detection circuit 431, whereby the confidentiality of memory data is readily improved as well.

Alternatively, data signal may be output from the data mask section 224 when the variation in the light intensity exhibits a predetermined pattern. Moreover, the light detection of embodiment 4 may be used in combination with the above-described temperature detection.

(Embodiment 5)

Figure 11:
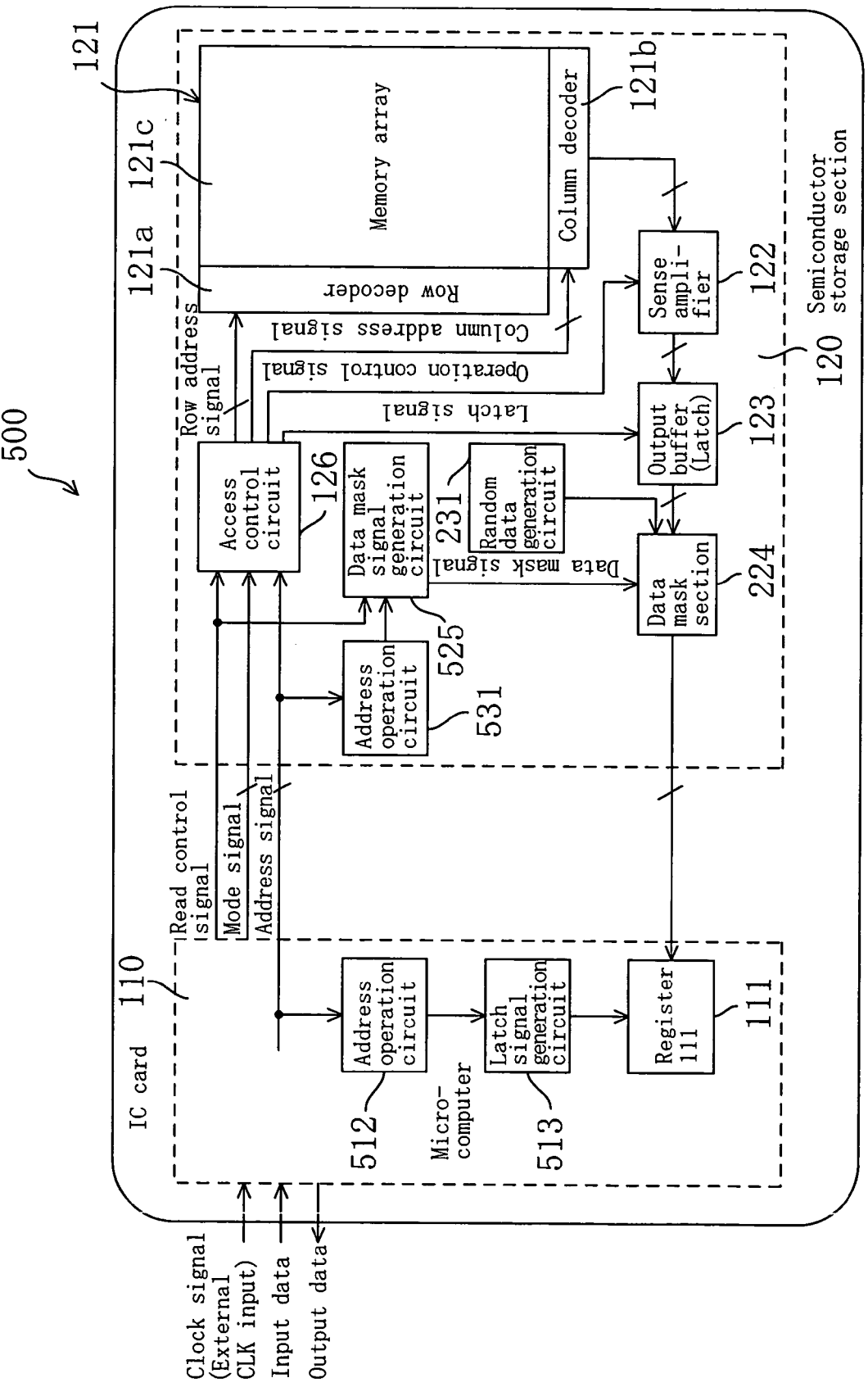
FIG. 11 is a block diagram showing the entire structure of an IC card 500 according to embodiment 5.

Referring to FIG. 11, an IC card 500 of embodiment 5 is different from the IC card 100 of embodiment 1 in that the IC card 500 includes a data mask signal generation circuit 525 in place of the data mask signal generation circuit 125 and further includes an address operation circuit 531, and the microcomputer 110 includes an address operation circuit 512 and a latch signal generation circuit 513.

The address operation circuit 531 performs a predetermined arithmetic operation (or performs no operation) based on an address signal output from the microcomputer 110 and outputs a result of the operation to the data mask signal generation circuit 525. Specifically, the address operation circuit 531 outputs, for example, a value of the LSB of an address, the values of a plurality of predetermined bits, a value obtained by subjecting such a value to a predetermined conversion, or the like. It should be noted that the arithmetic operation may be performed based on a row address and a column address output from the access control circuit 126.

The data mask signal generation circuit (timing control circuit) 525 controls the timing for outputting the read data signal from the data mask section (mask circuit) 224 as in embodiment 1. However, in the data mask signal generation circuit 525, any one of time interval t1, which lasts from a falling edge of the clock signal till the data mask signal rises to the H level, and time interval t2, during which the data mask signal is at the H level, is determined based on the operation result output from the address operation circuit 531. In IC card 500 of embodiment 5, the timing at which the data mask signal rises to the H level is changed according to the address to be accessed in every memory access operation, whereas in the IC card 100 of embodiment 1 each of time intervals t1 and t2 has a predetermined length.

The address operation circuit 512 of the microcomputer 110 performs the same arithmetic operations as those carried out in the address operation circuit 531. The latch signal generation circuit (timing control circuit) 513 outputs a latch signal to a register 111 based on the operation result output from the address operation circuit 512. More specifically, the latch signal generation circuit 513 changes the level of the latch signal (forms an edge in the latch signal) based on the operation result of the address operation circuit 512 at a certain timing during time interval t2, i.e., at a timing during the interval where the data mask signal is at the H level.

In the IC card 500 having the above structure, the timing of the data mask signal always corresponds to that of the latch signal in the microcomputer 110, and therefore, the microcomputer 110 normally operates irrespective of the frequency of the clock signal. However, since the timing for outputting appropriate memory data from the data mask section 224 is changed for every memory access operation, it is difficult to analyze the data transmitted through a signal line (data bus) between the data mask section 224 and the microcomputer 110 by touching the signal line with a probe.

(Embodiment 6)

Figure 12:
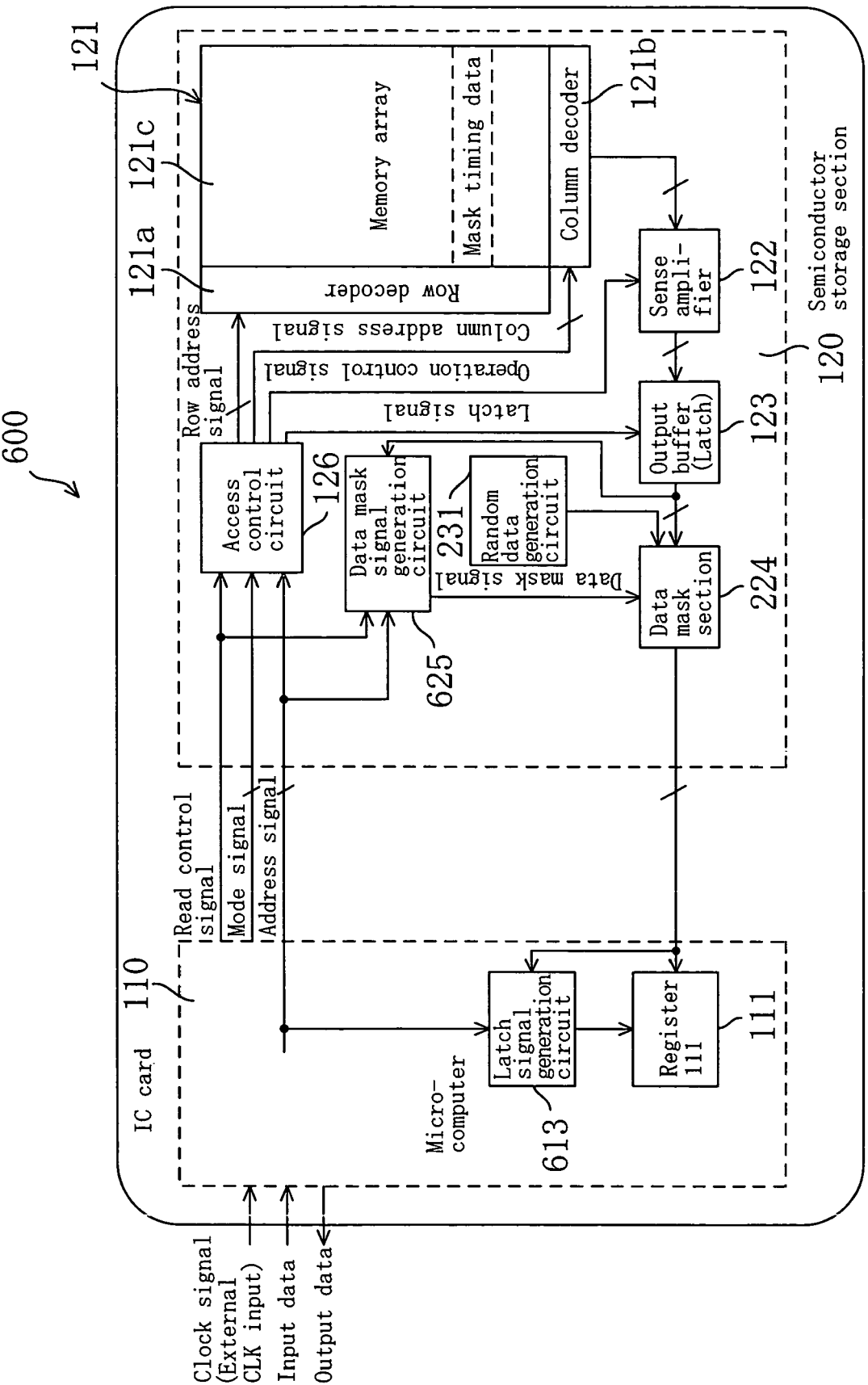
FIG. 12 is a block diagram showing the entire structure of an IC card 600 according to embodiment 6.

In an IC card 600 of embodiment 6 shown in FIG. 12, a predetermined area of the memory array unit 121 stores mask timing data which corresponds to the time period where the data mask signal is at the H level (time intervals t1 and t2). With the mask timing data, time intervals t1 and t2 and the timing for taking data into the microcomputer 110 are set.

Specifically, the IC card 600 of embodiment 6 is different from the IC card 500 of embodiment 5 in that the IC card 600 includes a data mask signal generation circuit 625 in place of the address operation circuit 531 and the data mask signal generation circuit 525, and the microcomputer 110 includes a latch signal generation circuit 613 in place of the address operation circuit 512 and the latch signal generation circuit 513.

The data mask signal generation circuit (timing control circuit) 625 receives an address signal and a data signal which is output from the output buffer 123. When a predetermined address area of the memory array unit 121 is accessed, the time intervals t1 and t2 are set based on the mask timing data output from the output buffer 123, whereby the data mask section (mask circuit) 224 is controlled.

The latch signal generation circuit (timing control circuit) 613 of the microcomputer 110 receives an address signal and a data signal which is output from the data mask section 224. The latch signal generation circuit 613 sets the edge timing of a latch signal which is to be output to the register 111 in synchronization with setting of time intervals t1 and t2 in the data mask signal generation circuit 625.

With the above structure, the timing for outputting appropriate memory data from the data mask section 224 can be set in a flexible manner, and therefore, it is more difficult to analyze data by touching a data bus with a probe.

It should be noted that a plurality of pieces of mask timing data may be prepared and may be selectively used.

(Embodiment 7)

Figure 13:
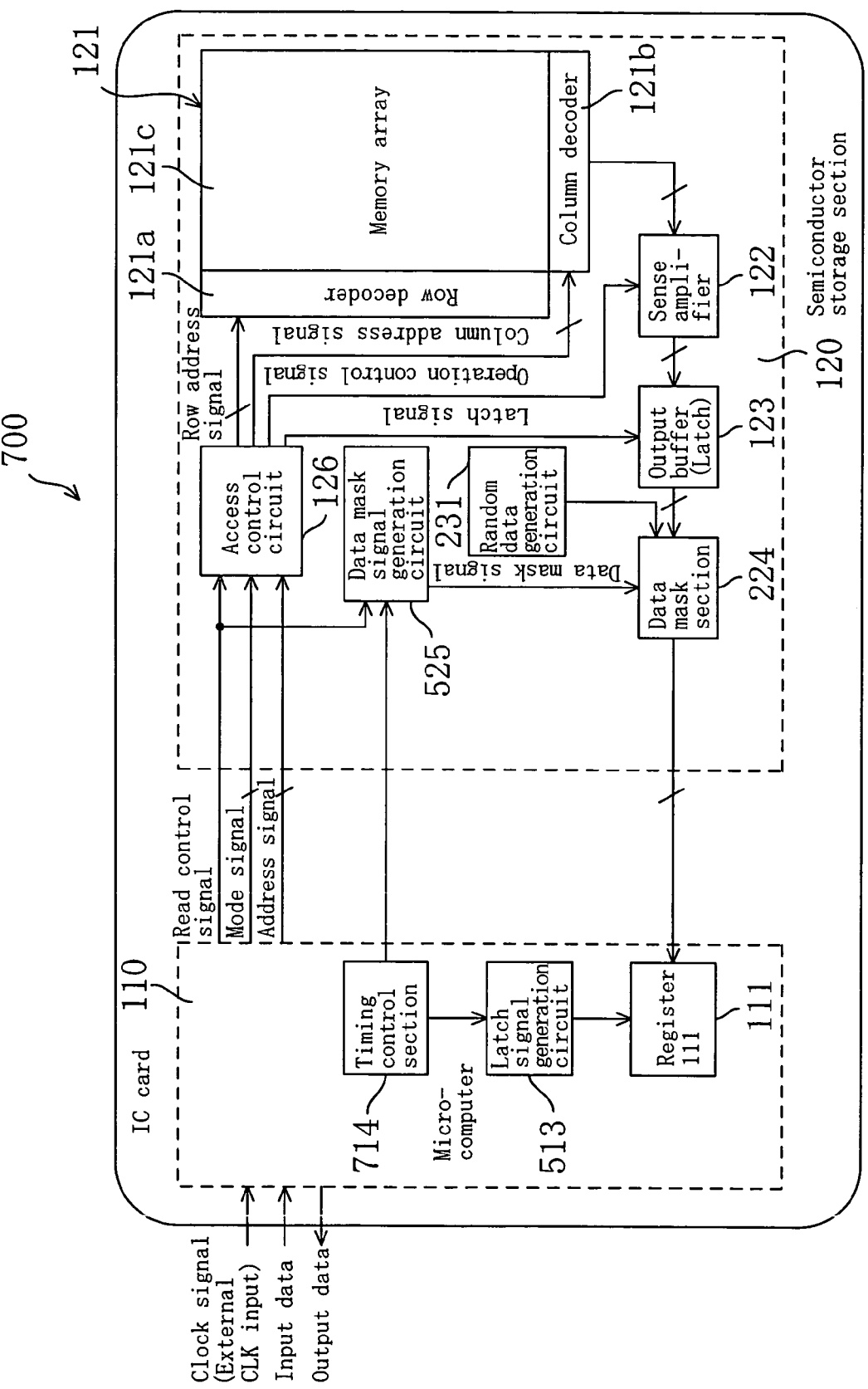
FIG. 13 is a block diagram showing the entire structure of an IC card 700 according to embodiment 7.

Referring to FIG. 13, an IC card 700 of embodiment 7 is different from the IC card 500 of embodiment 5 in that the IC card 700 includes a timing control section (timing control circuit) 714 in place of the address operation circuits 512 and 531. The latch signal generation circuit 513 and the data mask signal generation circuit 525 control the timing for pulling the data mask signal to the H level, the timing for pulling the data mask signal to the L level, and the timing for taking a data signal output from the data mask section (mask circuit) 224 into the register 111 of the microcomputer 110 based on the output of the timing control section 714.

Specifically, the timing control section 714 may output random numbers every time memory data is read out or the microcomputer 110 starts its operation. Alternatively, the timing control section 714 may output a value determined by a program or a value uniquely allocated to an IC card.

Also with this structure, it becomes more difficult to analyze data by touching a data bus with a probe as in embodiments 6 and 7, and therefore, the confidentiality of the memory data is improved.

In each of the above-described embodiments, an IC card has been described as an example of a storage device incorporating a memory and a microcomputer, but the present invention is not limited thereto. The storage device of the present invention may be a tag-type storage device or may be a contact-type storage device which establishes a connection with a host apparatus through physical contact of connection terminals. Alternatively, the storage device may be a non-contact type device which establishes a connection through an electromagnetic wave.

The structure of the above embodiments and variations thereof may be selectively combined within the logically permissible range. Specifically, in the structures of embodiments 3–7, for example, the L-level (or H-level) signal may be output as in embodiment 1 in place of the random data signal. Alternatively, the temperature detection circuit 331 of embodiment 3 and/or the light detection circuit 431 of embodiment 4 may be added to the structures of embodiments 5–7.

As described above, according to a storage device of the present invention, data read from a memory is taken into a microcomputer only when a clock signal has a predetermined frequency, or the timing for taking the data into the microcomputer is variable. With such a structure, it is difficult for a third person to fraudulently read and analyze data stored in the storage device. Accordingly, the confidentiality of the storage device, such as an IC card, or the like, is readily improved. On the other hand, by supplying a clock signal having a predetermined frequency, internal data can readily be read out as necessary.

What is claimed is:

1. A storage device, comprising:
   a memory;
   a microcomputer for taking in data read from the memory according to a externally-supplied clock signal or a clock signal generated based on the externally-supplied clock signal;
   a timing signal output circuit for outputting a timing signal indicative of a timing that is shifted by a first predetermined time period, which is determined according to a frequency of the clock signal which allows reading of data, from a predetermined edge in a read control signal which is used for controlling reading of data from the memory;
   a read data control circuit for performing control based on the timing signal for outputting the data read from the memory to the microcomputer; and
   a mask circuit for doing the following three steps during each one read cycle:
   (a) masking the data read from the memory to the microcomputer for the first predetermined time period;
   (b) allowing to pass the data read from the memory to the microcomputer for a second predetermined time period which is determined according to a frequency of the clock signal which allows reading of the data and;
   (c) masking the data read from the memory to the microcomputer until the next read cycle begins;
   wherein the read data control circuit performs control such that the microcomputer takes in the data output from the mask circuit only when the clock signal has a frequency between an upper limit and a lower limit determined according to the first and second predetermined time periods.

2. The storage device of claim 1, wherein the mask circuit outputs data different from the data read from the memory during a time period other than the second predetermined time period.

3. The storage device of claim 1, further comprising a temperature detection circuit,
   wherein the read data control circuit performs control such that the microcomputer takes in the data read from the memory only when the temperature detection circuit detects a predetermined temperature.

4. The storage device of claim 1, further comprising a light detection circuit,
   wherein the read data control circuit performs control such that the microcomputer takes in the data read from the memory only when the light detection circuit detects light having a predetermined intensity.

5. A storage device, comprising:
   a memory;
   a microcomputer for taking in data read from the memory according to an externally-supplied clock signal or a clock signal generated based on the externally-supplied clock signal;
   a mask circuit for outputting the data read from the memory to the microcomputer for a predetermined time period less than each one read cycle; and
   a timing control circuit for performing control such that the predetermined time period less than each one read cycle during which the mask circuit outputs the data read from the memory and the timing for taking the data output from the mask circuit into the microcomputer correspond to each other and are variable.

6. The storage device of claim 5, wherein the timing control circuit sets the predetermined time period less than each one read cycle during which the mask circuit outputs the data read from the memory and the timing for taking the data output from the mask circuit into the microcomputer, based on at least any one of the followings:
   data retained in a predetermined area of the memory;
   an address output from the microcomputer; and
   a predetermined signal output from the microcomputer.

* * * * *